(12) United States Patent
Kopylovitz et al.

(10) Patent No.: US 8,458,145 B2
(45) Date of Patent: Jun. 4, 2013

(54) SYSTEM AND METHOD OF STORAGE OPTIMIZATION

(75) Inventors: Haim Kopylovitz, Herzliya (IL); Julian Satran, Omer (IL); Yechiel Yochai, D.N. Menashe (IL)

(73) Assignee: Infinidat Ltd., Herzliya (IL)

( * ) Notice: Subject to any disclaimer, the term of this patent is extended or adjusted under 35 U.S.C. 154(b) by 183 days.

(21) Appl. No.: 13/010,337

(22) Filed: Jan. 20, 2011

(65) Prior Publication Data
US 2012/0191667 A1 Jul. 26, 2012

(51) Int. Cl.
*G06F 7/00* (2006.01)
*G06F 17/30* (2006.01)
*G06F 3/06* (2006.01)

(52) U.S. Cl.
USPC ........... 707/692; 707/637; 707/648; 707/747; 707/812; 711/161; 711/154

(58) Field of Classification Search
CPC ............... G06F 7/00; G06F 17/30; G06F 3/06
USPC ................. 707/609, 694, 697–699, 713, 715, 707/821–831, 637, 648, 664, 692, 747, 812; 709/203, 206, 218–223; 711/154, 209
See application file for complete search history.

(56) References Cited

U.S. PATENT DOCUMENTS

| | | | |
|---|---|---|---|
| 5,551,020 A * | 8/1996 | Flax et al. ............................ 1/1 |
| 7,519,635 B1 | 4/2009 | Haustein et al. | |
| 7,814,074 B2 | 10/2010 | Anglin et al. | |
| 7,822,939 B1 | 10/2010 | Veprinsky et al. | |
| 7,904,640 B2 * | 3/2011 | Yano et al. .................... | 711/103 |
| 8,140,821 B1 * | 3/2012 | Raizen et al. .................. | 711/202 |
| 8,301,861 B2 * | 10/2012 | Reiter et al. ................... | 711/170 |
| 2004/0030822 A1 * | 2/2004 | Rajan et al. ........................ | 711/4 |
| 2004/0044846 A1 * | 3/2004 | Matthews et al. ............. | 711/113 |
| 2005/0228950 A1 * | 10/2005 | Karr ................................ | 711/114 |
| 2006/0059173 A1 | 3/2006 | Hirsch et al. | |
| 2006/0059207 A1 | 3/2006 | Hirsch et al. | |

(Continued)

FOREIGN PATENT DOCUMENTS

WO WO 2008/005211 A2 1/2008
WO WO 2008/005212 * 1/2008

OTHER PUBLICATIONS

Chuanyi Liu et al., "ADMAD: Application-Driven Metadata Aware De-duplication Archival Storage System", Fifth IEEE International Workshop on Storage Network Architecture and Parallel I/Os, 2008 IEEE, pp. 29-35.*

(Continued)

*Primary Examiner* — Srirama Channavajjala
(74) *Attorney, Agent, or Firm* — Wiggin and Dana LLP; Gregory S. Rosenblatt (57) ABSTRACT

A method and system are disclosed for storage optimization. Data parts and metadata within a source data unit are identified and the data parts are compared with data which is already stored in the physical storage space. In case identical data parts are found within the physical storage, the data parts from the source data unit are linked to the identified data, while the data parts can be discarded, thereby reducing the required storage capacity. The metadata parts can be separately stored in a designated storage area.

21 Claims, 7 Drawing Sheets

U.S. PATENT DOCUMENTS

| | | | |
|---|---|---|---|
| 2008/0005141 | A1 | 1/2008 | Zheng et al. |
| 2008/0005146 | A1* | 1/2008 | Kubo et al. ................... 707/102 |
| 2009/0077306 | A1* | 3/2009 | Arcedera et al. ............. 711/103 |
| 2009/0089483 | A1* | 4/2009 | Tanaka et al. ................ 711/103 |
| 2009/0132619 | A1* | 5/2009 | Arakawa et al. .............. 707/205 |
| 2009/0172308 | A1* | 7/2009 | Prins et al. ................... 711/154 |
| 2009/0234892 | A1 | 9/2009 | Anglin et al. |
| 2010/0131706 | A1* | 5/2010 | Bean et al. ................... 711/114 |
| 2010/0199065 | A1* | 8/2010 | Kaneda ........................ 711/209 |
| 2010/0235602 | A1* | 9/2010 | Chan ............................. 711/170 |
| 2011/0231596 | A1* | 9/2011 | Goss et al. ................... 711/103 |
| 2011/0246431 | A1* | 10/2011 | Iitsuka ......................... 707/692 |
| 2012/0226699 | A1* | 9/2012 | Lillibridge ................... 707/747 |
| 2012/0246438 | A1* | 9/2012 | Aronovich et al. ........... 711/172 |

OTHER PUBLICATIONS

"EMC Glossary . . . ," http://www.datadomain.com/resources/faq.html, year unknown.

"The Data Integrity . . . ," http://www.t10.org/ftp/t10/document.03/03-111r0.pdf, year unknown.

http://www.usenix.org/event/lsf07/tech/petersen.pdf, year unknown.

"http://t10.org/ftp/t10/document.03/03-110r1.pdf", May 7, 2003.

http://martinpetersen.sys-con.com/node/480659/mobile, 2008 Sys.Con.Media.

"http://www.snia.org/images/tutorial_docs/Storage/RichardVanderbilt_Why_Data_Integrity_rev2.pdf", Year unknown.

* cited by examiner

SYSTEM AND METHOD OF STORAGE OPTIMIZATION

FIELD OF THE INVENTION

This invention relates in general to the field of computer storage systems and more specifically to the optimization of computer storage systems utilizing deduplication.

BACKGROUND OF THE INVENTION

Growing complexity of storage infrastructure requires solutions for efficient use and management of resources. The use of a virtualized storage system enables to present to the user a logical space for data storage while the storage system itself handles the process of mapping it to the actual physical location. Today many virtualized storage systems implement data deduplication. Data deduplication is a data compression technique of optimizing the efficiency of utilization of available storage space in a storage system (including storage area network systems (SAN)). In the deduplication process a single copy of a data unit is stored while duplications of identical data units are eliminated and only a virtual representation of these units is maintained. In response to a request (e.g. to a read request) for these data units, the data can be easily reconstructed. By storing a single copy of each data unit, deduplication enables to reduce the required storage space of a physical storage.

In some cases it may occur that substantial parts of different data units are identical while significantly smaller parts are non-identical. In such scenarios currently known deduplication techniques which require complete identity between the data unit, would determine such data unit as non-identical and store all of different data portion on the physical storage.

Prior art references considered to be relevant as background to the invention are listed below. Acknowledgement of the references herein is not to be inferred as meaning that these are in any way relevant to the patentability of the invention disclosed herein.

US Patent Application No. 2009234892 discloses a system and method for assuring integrity of deduplicated data objects stored within a storage system. A data object is copied to secondary storage media, and a digital signature such as a checksum is generated of the data object. Then, deduplication is performed upon the data object and the data object is split into chunks. The chunks are combined when the data object is subsequently accessed, and a signature is generated for the reassembled data object. The reassembled data object is provided if the newly generated signature is identical to the originally generated signature, and otherwise a backup copy of the data object is provided from secondary storage media.

US Patent Application No. US2008005141 discloses a system and method for calculating and storing block fingerprints for data deduplication. A fingerprint extraction layer generates a fingerprint of a predefined size, e.g., 64 bits, for each data block stored by a storage system. Each fingerprint is stored in a fingerprint record, and the fingerprint records are, in turn, stored in a fingerprint database for access by the data deduplication module. The data deduplication module may periodically compare the fingerprints to identify duplicate fingerprints, which, in turn, indicate duplicate data blocks.

U.S. Pat. No. 7,822,939 discloses a system for de-duplicating data, which includes providing a first volume including at least one pointer to a second volume that corresponds to physical storage space, wherein the first volume is a logical volume. A first set of data is detected as a duplicate of a second set of data stored on the second volume at a first data chunk. A pointer of the first volume associated with the first set of data is modified to point to the first data chunk. After modifying the pointer, no additional physical storage space is allocated for the first set of data.

Thus, there is still a need in the art to further improve the efficiency of the utilization of physical storage and provide deduplication techniques which enable to further reduce storage space requirements.

SUMMARY OF THE INVENTION

According to certain aspects of the disclosed subject matter there is provided a storage system, the system comprising: a plurality of physical storage devices controlled by a plurality of storage control devices constituting a storage control layer, the storage control layer operatively coupled to the plurality of physical storage devices storing a plurality of data units, wherein the storage control layer being operable to identify a first data part and a respective first metadata part within a first data unit, and to perform at least the following operations: identify at least one data unit among the plurality of data units, having a data part which is identical to the first data part and a respective metadata part, which is different than the first metadata part, by comparing the first data part and the respective first metadata part with data parts and respective metadata parts of data units from the plurality of data units, thereby giving rise to partly-identical data units; associate a logical address corresponding to a data part of one data unit of the partly-identical data units with a physical address of a data part of a second data unit of the partly-identical data units; store the respective first metadata part in a designated area in the physical storage and associate a logical address of the respective first metadata part with a physical address of the metadata part; and discard the data part of the one data unit of the partly-identical data units, thereby reducing volume of stored data in the physical storage.

According to further aspects of the disclosed subject matter the control layer is further operable to receive information at least in respect of the first data unit including at least a size of the first metadata part and its location in respect of the first data unit and is operable to identify the first data part and the first metadata part within the data unit based on the received information.

According to further aspects of the disclosed subject matter the control layer is operable to identify data units among the plurality of data units, having data parts which are identical to the first data part, and having respective metadata parts, which are identical to the first metadata part, by comparing the first data unit with data units from the plurality of data units, thereby giving rise to identical data units; associate a logical address corresponding to one of the identical data units with a physical address of another identical data unit of the identical data units and discard one of the identical data units.

According to further aspects of the disclosed subject matter the control layer is operable to calculate a hash value for at least the first data part; wherein the comparing is performed by comparing the hash value with other hash values calculated for data parts of at least part of the plurality of data units.

According to further aspects of the disclosed subject matter the control layer is further operable to divide a data unit into a plurality of subunits, and wherein the first data unit is one of subunits generated by such division.

According to further aspects of the disclosed subject matter the control layer is operatively connectable to one or more hosts and, in response to a read request issued by a host requesting for a data unit comprising the first data part and the first metadata part operable to perform at least the following:

identify that the first metadata part is characterized by a logical address associated with a designated area; retrieve the first metadata part from the designated area based on its physical address; retrieve the first data part from its physical storage device; combine the first data part and the first metadata part and reconstruct the first data unit.

According to other aspects of presently disclosed subject matter there is provided a SO (storage optimization) module operatively connectable to a storage control layer in a storage system, the storage system comprising a plurality of physical storage devices, storing a plurality of data units, and controlled by a plurality of storage control devices constituting the storage control layer, the layer operatively coupled to the plurality of physical storage devices; the SO module being operable to identify a first data part and a respective first metadata part within a first data unit, and to perform at least the following operations: identify at least one data unit among the plurality of data units, a having data part which is identical to the first data part and a respective metadata part, which is different than the first metadata part, by comparing the first data part and the respective first metadata part with data parts and respective metadata parts of data units from the plurality of data units, thereby giving rise to partly-identical data units; associate a logical address corresponding to a data part of one data unit of the partly-identical data units with a physical address of a data part of a second data unit of the partly-identical data units; store the respective first metadata part in a designated area in the physical storage and associate a logical address of the respective first metadata part with a physical address of the metadata part; and discard the data part of the one data unit of the partly-identical data units, thereby reducing volume of stored data in the physical storage.

According to other aspects of the presently disclosed subject matter there is provided a method of allocating data to a physical data storage associated with a storage system comprising a plurality of physical storage devices storing a plurality of data units, the method comprising: identifying a first data part and a respective first metadata part within a first data unit; identifying at least one data unit among the plurality of data units, having a data part which is identical to the first data part and a respective metadata part, which is different than the first metadata part, by comparing the first data part and the respective first metadata part with data parts and respective metadata parts of data units from the plurality of data units, thereby giving rise to partly-identical data units; associating a logical address corresponding to a data part of one data unit of the partly-identical data units with a physical address of a data part of a second data unit of the partly-identical data units; storing the respective first metadata part in a designated area in the physical storage; associating a logical address of the respective first metadata part with a physical address of the metadata part; and discarding the data part of the one data unit of the partly-identical data units, thereby reducing volume of stored data in the physical storage.

According to further aspects of the disclosed subject matter the method further comprises receiving information at least in respect of the first data unit including at least a size of the first metadata part and its location in respect of the first data unit and identifying the first data part and the first metadata part within the data unit based on the received information.

According to further aspects of the disclosed subject matter the method further comprises identifying data units among the plurality of data units, having data, parts which are identical to the first data part, and having respective metadata parts, which are identical to the first metadata part, by comparing the first data unit with data units from the plurality of data units, thereby giving rise to identical data units; associating a logical address corresponding to one of the identical data units with a physical address of another identical data unit of the identical data units and discarding tone of the identical data units.

According to further aspects of the disclosed subject matter the method further comprises calculating a hash value for at least the first data part; wherein the comparing is performed by comparing the hash value with other hash values calculated for data parts of at least part of the plurality of data units.

According to further aspects of the disclosed subject matter the method further comprises concatenating data parts corresponding to the plurality of subunits within the data unit and comparing the concatenated data parts with concatenated data parts corresponding to other data units stored within the storage devices.

According to other aspects of the presently disclosed subject matter there is provided a program storage device readable by machine, tangibly embodying a program of instructions executable by the machine to perform method steps of allocating data to a physical data storage associated with a storage system comprising a plurality of physical storage devices storing a plurality of data units, the method comprising identifying a first data part and a respective first metadata part within a first data unit; identifying at least one data unit among the plurality of data units, having data parts which are identical to the first data part and a respective metadata part, which is different than the first metadata part, by comparing the first data part and the respective first metadata part with data parts and respective metadata parts of data units from the plurality of data units, thereby giving rise to partly-identical data units; associating a logical address corresponding to a data part of one data unit of the partly-identical data units with a physical address of a data part of a second data unit of the partly-identical data units; storing the respective first metadata part in a designated area in the physical storage; associating a logical address of the respective first metadata part with a physical address of the metadata part; and discarding the data part of the one data unit of the partly-identical data units, thereby reducing volume of stored data in the physical storage.

BRIEF DESCRIPTION OF THE DRAWINGS

In order to understand the disclose subject matter and to see how it may be carried out in practice, embodiments will now be described, by way of non-limiting example only, with reference to the accompanying drawings, in which.

DETAILED DESCRIPTION

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "processing", "controlling", "configuring", "receiving", "enabling", "performing", "executing", "monitoring", "analyzing", "determining", "identifying", "associating", "discarding", "storing", "comparing", "calculating", "retrieving", "combining", "concatenating" "defining" or the like, include action and/or processes of a computer that manipulate and/or transform data into other data, the data represented as physical quantities, e.g. such as electronic quantities, and/or the data representing the physical objects. The term "computer" should be expansively construed to cover any kind of electronic device with data processing capabilities. The operations in accordance with the teachings herein may be performed by a computer specially constructed for the desired purposes or by a general purpose computer specially configured for the desired purpose by a computer program stored in a computer readable storage medium.

It is appreciated that certain features of the disclosed subject matter, which are, for clarity, described in the context of separate embodiments, may also be provided in combination in a single embodiment. Conversely, various features of the disclosed subject matter, which are, for brevity, described in the context of a single embodiment, may also be provided separately or in any suitable sub-combination.

In embodiments of the disclosed subject matter, fewer, more and/or different stages than those shown in FIGS. 2-4 and 6 may be executed. In embodiments of the disclosed subject matter one or more stages illustrated in FIGS. 2-4 and 6 may be executed in a different order and/or one or more groups of stages may be executed simultaneously.

Certain embodiments of the presently disclosed subject matter are applicable to the architecture of a computer system described with reference to FIG. 1. However, the disclosed subject matter is not bound by the specific architecture, equivalent and/or modified functionality may be consolidated or divided in another manner and may be implemented in any appropriate combination of software, firmware and hardware. Those versed in the art will readily appreciate that the disclosed subject matter is, likewise, applicable to any computer system and any storage architecture implementing a virtualized storage system. In different embodiments of the disclosed subject matter the functional blocks and/or parts thereof may be placed in a single or in multiple geographical locations (including duplication for high-availability); operative connections between the blocks and/or within the blocks may be implemented directly (e.g. via a bus) or indirectly, including remote connection. The remote connection may be provided via Wire-line, Wireless, cable, Internet, Intranet, power, satellite or other networks and/or using any appropriate communication standard, system and/or protocol and variants or evolution thereof (as, by way of unlimited example, Ethernet, iSCSI, Fiber Channel, etc.).

Figure 1:
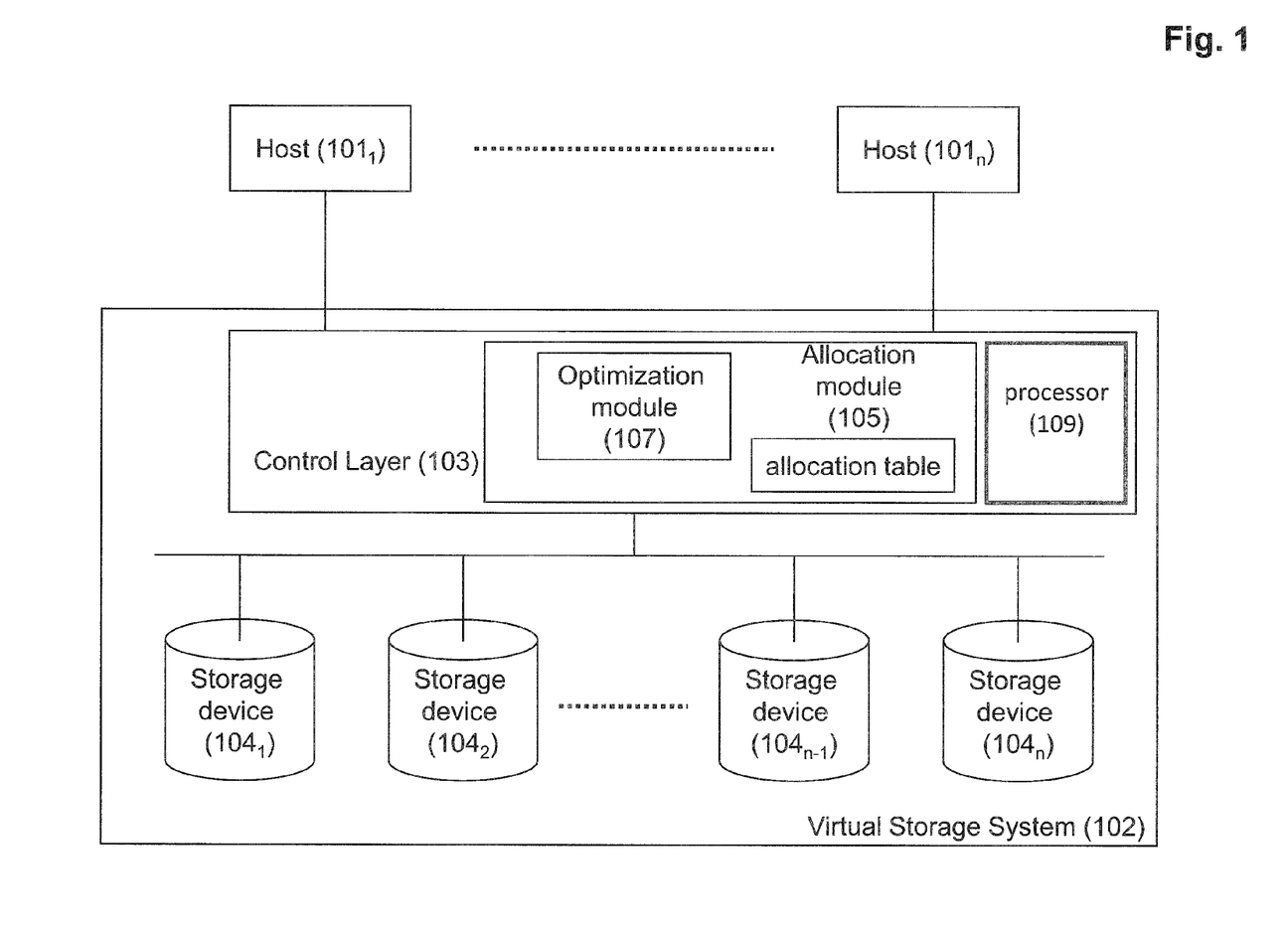
FIG. 1 illustrates a schematic functional block diagram of a computer system with virtualized storage system, according to the disclosed subject matter.

Bearing this in mind, attention is drawn to FIG. 1 illustrating a schematic functional block diagram of a computer system with a virtualized storage system, according to the disclosed subject matter. The computer system comprises a plurality of host computers (workstations, application servers, etc.) illustrated as $101_{1-n}$ sharing common storage means provided by a virtualized storage system 102. The storage system comprises a storage control layer 103 comprising one or more appropriate storage control devices operatively coupled to the plurality of host computers and a plurality of data storage devices $104_{1-n}$ constituting a physical storage space optionally distributed over one or more storage nodes, wherein the storage control layer 103 is operable to control interface operations (including I/O operations) between hosts $101_{1-n}$ and data storage devices $104_{1-n}$. The storage control layer 103 is further operable to handle a virtual representation of physical storage space and to facilitate necessary mapping between the physical storage space and its virtual representation. Control layer 103 is configured to create and manage at least one virtualization layer interfacing between elements of the computer system (host computers, etc.) external to the storage system and the physical storage space.

The virtualization functions may be provided in hardware, software, firmware or any suitable combination thereof. Optionally, the functions of control layer 103 may be fully or partly integrated with one or more host computers and/or storage devices and/or with one or more communication devices enabling communication between the hosts and the storage devices. Optionally, a format of logical representation provided by control layer 103 may differ, depending on interfacing applications.

The physical storage space may comprise any appropriate permanent storage medium and include, by way of non-limiting example, one or more disk drives and/or one or more disk units (DUs). The physical storage space comprises a plurality of data blocks, each data block may be characterized by a pair ($DD_{id}$, DBA) where $DD_{id}$ is a serial number associated with the disk drive accommodating the data block, and DBA is a logical block number within the respective disk. By way of non-limiting example, $DD_{id}$ may represent a serial number internally assigned to the disk drive by the system or, alternatively, a WWN or universal serial number assigned to the disk drive by a vendor. The storage control layer 103 and storage devices $104_{1-n}$ may communicate with host computers $101_{1-n}$ and within the storage system in accordance with any appropriate storage protocol.

Stored data may be logically represented to a client (host) in terms of logical objects. Depending on the storage protocol, the logical objects may be logical volumes, data files, multimedia files, snapshots and other copies, etc.

A logical volume (LU) is a virtual entity logically presented to a client as a single virtual storage device. The logical volume represents a plurality of data blocks characterized by successive Logical Block Addresses (LBA) ranging from 0 to a number LUK. Different LUs may comprise different numbers of data blocks, while the data blocks are typically of equal size (e.g. 512 bytes). Blocks with successive LBAs may be grouped into portions that act as basic units for data handling and organization within the system. Thus, for instance, whenever space has to be allocated on a disk or on a memory component in order to store data, this allocation may be done in terms of "data portions" otherwise also known as "allocation units". Data portions are typically (but not necessarily) of equal size throughout the system. Successive data portions constituting a logical volume are typically stored in different disk drives (e.g. for purposes of both performance and data protection), and to the extent that it is possible, across different DUs. For purpose of illustration only, the operation of the storage system 102 is described herein in terms of entire data portions. Those skilled in the art will readily appreciate that the teachings of the presently disclosed subject matter are applicable in a similar manner to parts of data portions.

Typically, definition of LUs in the storage system involves in-advance configuring an allocation scheme and/or allocation function used to determine the location of the various data portions (and their associated parity portions) across the physical storage medium. The allocation scheme can be handled for example, by an allocation module 105 being a part of the storage control layer 103. The location of various data portions allocated across the physical storage can be recorded and monitored with the help of one or more allocation tables linking between logical data addresses and their corresponding allocated location in the physical storage.

The allocation module 105 may be implemented as a centralized module operatively connected to the plurality of storage control devices or may be, at least partly, distributed over a part or all storage control devices. Logical contiguity of successive portions and physical contiguity of the storage location allocated to the portions in the system are not necessarily correlated. FIG. 1 also shows processor 109 being configured to manage and control different modules and operations associated with storage system 102 in general, and more specifically with control layer 103. It should be noted that although the term processor is used herein in its singular form, it should be interpreted to include any one or more processors operationally coupled to storage system 102.

In the present description the term "data unit" is a general term which includes units containing data of a certain size. For example, a data portion which is one type of data unit (e.g. with a size of 64 kilobyte) can be divided into 128 data units each of 512 bytes (e.g. blocks). Other data units of other sizes consisting different numbers of bytes or bits can be defined as well.

Control layer 103 can be further operable to perform a deduplication process, on data units. Such data units can be, for example, data units which are received from host computers $101_{1-n}$ to be stored on stored on storage devices $104_{1-n}$. In another example, such data units can be retrieved from storage devices $104_{1-n}$ by control layer 103, during an inspection process directed for improving storage efficiency and quality.

As explained above a deduplication process enables to reduce the required storage space by storing on the physical data storage only a single copy of different data units containing identical data. In the deduplication process incoming data units (e.g. in a write request) are uniquely identified and compared with previously stored data units. If an incoming data unit is identical to previously stored data units, the data units is not stored on the physical data storage and only a reference is maintained in an allocation table (which can be managed by allocation module 105) associating between the logical address of the incoming data unit and the identical data stored in the physical storage. On the other hand in case the data within the incoming data unit is not stored on the physical storage, control layer 103 stores the data on the physical storage and updates the allocation table to maintain a reference associating between the logical address of the data and its new physical address on the disk.

A common approach in a deduplication process, is to calculate, for an incoming data unit, a hash value (also known as "fingerprint"), using one or more types of hash algorithms and to associate the calculated hash values with the corresponding data unit. The calculated hash-values are compared with hash values which were calculated for other data units, stored on the physical storage, and are thus used to determine whether an identical data unit is already stored on the physical storage.

The size of the data unit on which deduplication is implemented can vary. While implementation deduplication on small data units increases the probability of identifying identical data units, and therefore increases the chances of decreasing the required storage space, the smaller the data units, the greater is the processing load and the greater is the complexity and size of the links configuration which is required in order to link between the logical address of data units the physical address of other identical data units which are already stored on the storage space.

While deduplication can be an efficient method for reducing storage space requirements, when implementing deduplication only on identical copies of data units, similarity between data units is overlooked, even where the difference between the data units is limited to a very small portion of the data. This scenario may occur, for example, where a certain host computer is operable to calculate a hash value of a predefined size (say 8 bytes) for each data unit of a given size (e.g. an 8 kilobytes data unit) and append the extra bytes of the calculated value to the data unit at a predefined location (e.g. at the end of the data unit or at the beginning of the data unit). Such hash values can be calculated for the purpose of source identification or protection against data corruption. If different hash functions are used or the hash function which is used for calculating the hash value includes one or more variables which are not dependent solely on the data within the data unit, a different hash value can be calculated for different data units having identical data.

Figure 7:
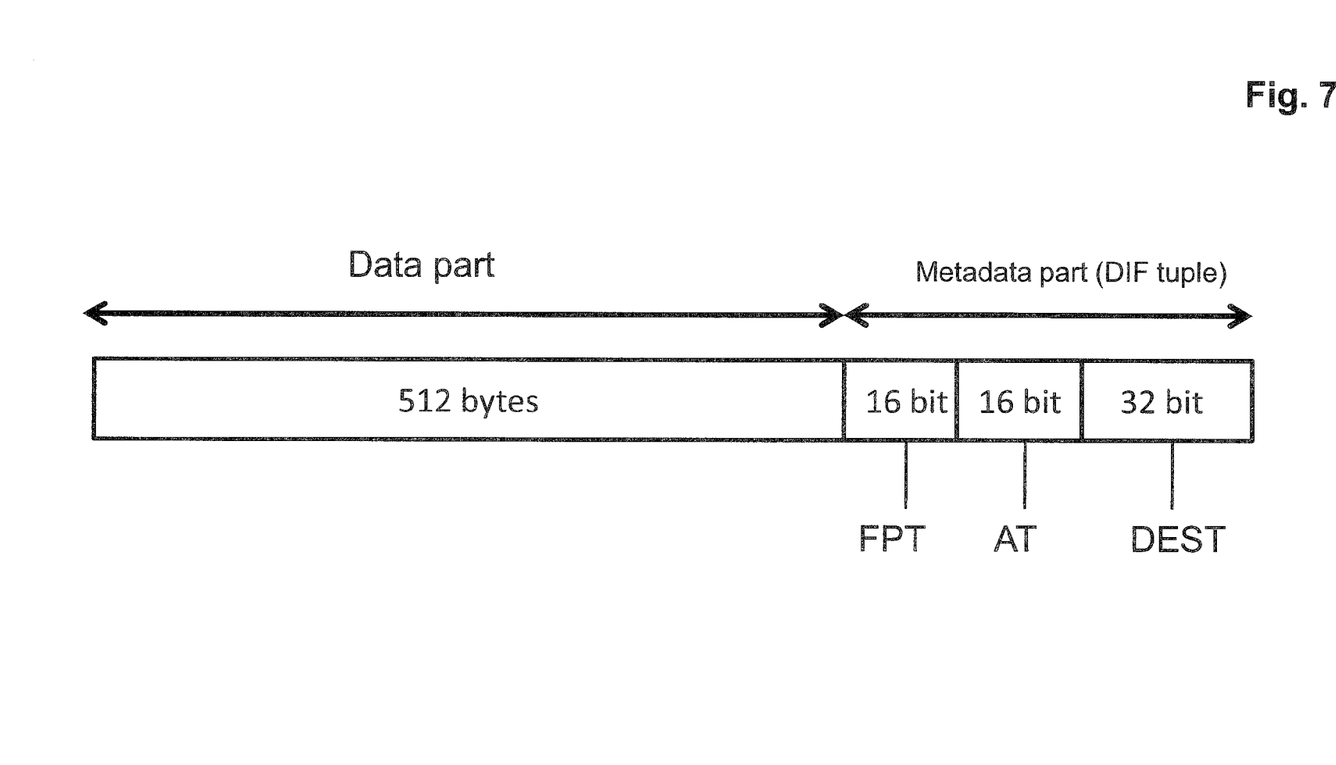

For example, in some implementations a Data Integrity Field (DIF) is appended to data units, for the purpose of preventing data corruption. In general data corruption includes errors in the data which may occur during the transmission of the data, while the data is stored on the disk or while data is being read from the disk or written to the disk. DIF includes a number of extra bytes which are added to a standard data unit and represent one or more metadata elements corresponding to the data unit. The DIF can be calculated, for example, by an application running on host computers $101_{1-n}$ and sent together with the data to control layer 103 in storage system 102. Control layer 103 can then store the data unit and the DIF tuple on the physical disk. FIG. 7 is a schematic illustration showing an example of a DIF tuple appended to a data unit, in this example an 8 byte DIF tuple is appended to a 512 byte block of data. It should be noted that the illustration in FIG. 7 is merely a non-liming example and should not be construed as limiting as other DIF configurations can be used instead or in addition to the one illustrated in FIG. 7. The illustrated DIF includes 3 metadata elements, a fingerprint (FPT), an application tag (AT) and a destination tag (DEST). FPT is 16 bit long and represents a hash value (e.g. CRC) which is calculated from the 512 bytes of data in the data unit. AT is also 16 bit long and is used by the application or operating system for the purpose of identifying data which is generated by a specific application. DEST is 32 bit long and is used to ensure the ordering of the individual data portions of an I/O request. The destination tag varies depending on protection type. In a common protection type, the destination tag is required to match the 32 lower bits of the target sector logical block address. This helps prevent misdirected writes, a common corruption error where data is written to the wrong place on the disk.

After the data unit is transmitted over a network (e.g. from host to storage system or vice versa) and before it is written to the disk, or when the data unit is later read from the disk, one or more of the DIF metadata elements can be re-calculated and compared with the previously calculated elements. If a discrepancy is found between the values of one or more of the DIF metadata elements and the newly calculated elements it may indicate that the data has been corrupted.

However, different DIF tuples can be calculated to identical data units. For example, the hash value function used for calculating the DEST element in a DIF tuple may result in different values when calculated for identical data where each data unit is directed to a different destination. In addition different applications may calculate a different hash value recognizing the specific application, for identical data units. Accordingly, data units with identical data may be appended with a different DIF tuple.

For the reasons specified above, in a deduplication process, data units which differentiate from previously stored data units in only a small portion and are otherwise identical, would calculate to different hash values in the deduplication process and therefore would be all stored on the physical storage. Thus, although only a very small part of the entire data is different (e.g. the metadata elements represented by the DIP tuple) the deduplication process would fail to detect the identity between the data units and as a result valuable disk storage-space is used for storing redundant data.

As explained in more detail below, control layer 103 can be operable to perform storage optimization on data units by implementing deduplication on data units which differentiate in part of their data. The different data can include for example metadata elements such as the elements of a DIF tuple. To this end control layer 103 can comprise, (or otherwise be associated with), a storage optimization (SO) module 107. SO module 107 can be, for example, part of allocation module 105 or otherwise associated therewith. In other cases SO module 107 can be directly associated or connected to storage system 102, not via control layer 103.

It should be noted that in the context of the subject matter disclosed herein, data units can include data parts and metadata parts (referred to herein also as metadata elements). Metadata parts can include for example auxiliary data which is used for characterizing the data. By way of non-limiting example metadata parts include metadata elements of a DIF tuple (described in more detail above with reference to FIG. 7) and other security related data such as for example, an administrator signature which is appended to data parts by an administrator for verification or authorization purposes. It should be noted that although the term "metadata" as used herein should be construed in a non-limiting manner to include any type of data which is differentiated from the rest of the data within a data unit.

Storage system 102 can be configured to receive and manage data according to a prescribed format. Thus, in case storage system 102 is configured to handle data units which include data parts and appended metadata parts, control layer 103 is provided with information in respect of the location and size of the data unit and the location and size of the metadata parts in respect of the data unit. Consider the example illustrated in FIG. 7, in case storage system 102 is operable to handle data units of 520 bytes which includes 512 bytes of data and 8 bytes of metadata (in this case the DIF tuple), this information can be made available to control layer 103 to enable control layer 103 to manage data units of this type.

In some cases control layer 103 is operable to manage data units which consist of several smaller subunits, where each of the smaller subunits is appended with metadata parts (e.g. DIF tuple). For example, as mentioned above control layer 103 can be operable to manage data portion consisting of 128 blocks. In case each block is of a size of 520 bytes of the format illustrated in FIG. 7, control layer 103 can be configured to manage data portions of the size of 66560 bytes.

Control layer 103 is operable to receive one or more data units. As mentioned above the data units can be received from one or more of hosts $101_{1-n}$ (e.g. in a write request to the storage system) and processed before they are stored with storage devices $104_{1-n}$. The data units can also be data units which are stored in storage devices $104_{1-n}$. Such data portions can be retrieved from storage devices $104_{1-n}$ by control layer 103, for example, during an inspection process directed for improving storage efficiency for example by a deduplication process. An example of such a process is a scrubbing operation. In a scrubbing operation data portions stored in storage devices are inspected in order to identify different errors in the data (e.g. incorrect data, incomplete data, duplicated data, readable or unreadable data etc.). Such errors can then be rectified, thereby maintaining data integrity and correctness. Thus, the operations performed by control layer 103 and storage optimization module 107 as described herein can be performed on data portions which are retrieved from the data storage devices $104_{1-n}$ specifically for that purpose or which are retrieved as part of a scrubbing process.

In some implementations, once a data unit is received by control layer 103, SO module 107 is operable to execute a deduplication process on the entire data unit. For better clarity of the description, data units which are processed by control layer 103 and more specifically by SO module 107, are referred to herein as "source data units". SO module 107 is operable to compare the source data unit with data which is stored in the physical storage space, on storage devices $104_{1-n}$. In case identical data is already stored on the physical storage space, SO module 107 is operable to update a corresponding allocation table with one or more references associating the logical address (e.g. defined by the LBA range of the data unit) of the source data unit with the physical address of the identical data unit while the data of the source data unit is discarded.

In case SO module 107 does not identify data which is identical to the entire source data unit, SO module 107 is operable to identify data parts and metadata parts within the source data unit and to compare the data parts from the source data unit with data parts which are stored in the physical storage space. In case identical data is found, SO module 107 can be made operable to update a corresponding allocation table with one or more references, associating the logical address of the data parts, within the source data unit, with the physical address of the identical data, while the data itself is not stored in the physical storage. The metadata parts on the other hand can be allocated to the physical storage, to a new physical address. The logical address of the metadata parts is associated with the new physical address.

In case SO module 107 does not identify data in the physical address which is identical neither to the data parts nor to the metadata parts within the source data unit, SO module 107 is operable to allocate the entire data unit to a new physical address in the physical storage and maintain a reference associating between the logical address of the data unit and the new physical address. A more detailed explanation of this process is described below with reference to FIG. 2 to FIG. 4.

As the use of storage optimization by SO module 107 described above consumes processing resources from storage system 102 and therefore may impact the overall performance of the system, there is a tradeoff between storage optimization and overall system performance. Accordingly, the decision whether to activate storage optimization can be dynamically set according to the current performance of the system.

In some implementations, the current free storage space is considered. Thus, for example in case control layer 103 detects that a certain part of the physical storage is occupied with data (e.g. more than 70% is occupied), SO module 107 becomes operable for storage optimization in order to make more storage space available. In another example in case the control layer 103 detects that a certain part of the physical storage is free (e.g. more than 50% is free), storage optimization can be deactivated.

In some implementations the performance of the processing resources of the system is considered. For example in case the control layer 103 determines that the system is working under heavy processing load, the storage optimization is deactivated in order to minimize the processing resources which are consumed by storage optimization.

In other cases the decision as to whether, and to what extent, storage optimization should be activated is made, while considering both the current available storage space and the current load on the processing resources of the storage system. Thus for example, in case the current processing load is greater than a certain threshold (e.g. 80%) the availability of the storage space is determined. In case the available storage space is greater than a certain threshold (e.g. greater than 50%) storage optimization is deactivated, otherwise storage optimization is maintained active.

According to the implementation which is being utilized control layer 103 (e.g. by SO module 107) can be operable to determine the storage space availability and/or the load on the system's processing resource, and based on one of these factors or a combination of the two, determine whether to operate storage optimization of the disclosed subject matter.

The decision whether to activate storage optimization can be based on additional criteria other than the system performance and storage space occupancy. U.S. provisional No. 61/391,657, which is incorporated herein by reference, describes a system and method which is operable inter alia, for analyzing frequency of accessing (otherwise referred to as "frequency of addressing") certain data portions and characterizing each data portion in accordance with frequency of accessing thereof. The analyzed data unit can, for example, be stored at a specific location within the physical storage, according to the determined frequency. As explained in 61/391,657 this is done, inter alia, for improving the performance of a storage system. Such analysis can be used in the context of the presently disclosed subject matter for determining whether to activate storage optimization. For example, control layer 103 can be operable to determine the accessing frequency of different data units and submit to storage optimization, data units which are characterized by an accessing frequency which is below a predefined value. Another criterion which can be considered is the source host or port of the data portion. Control layer 103 can be configured to limit storage optimization only to data units which arrive from a specific one or more hosts.

Figure 2:
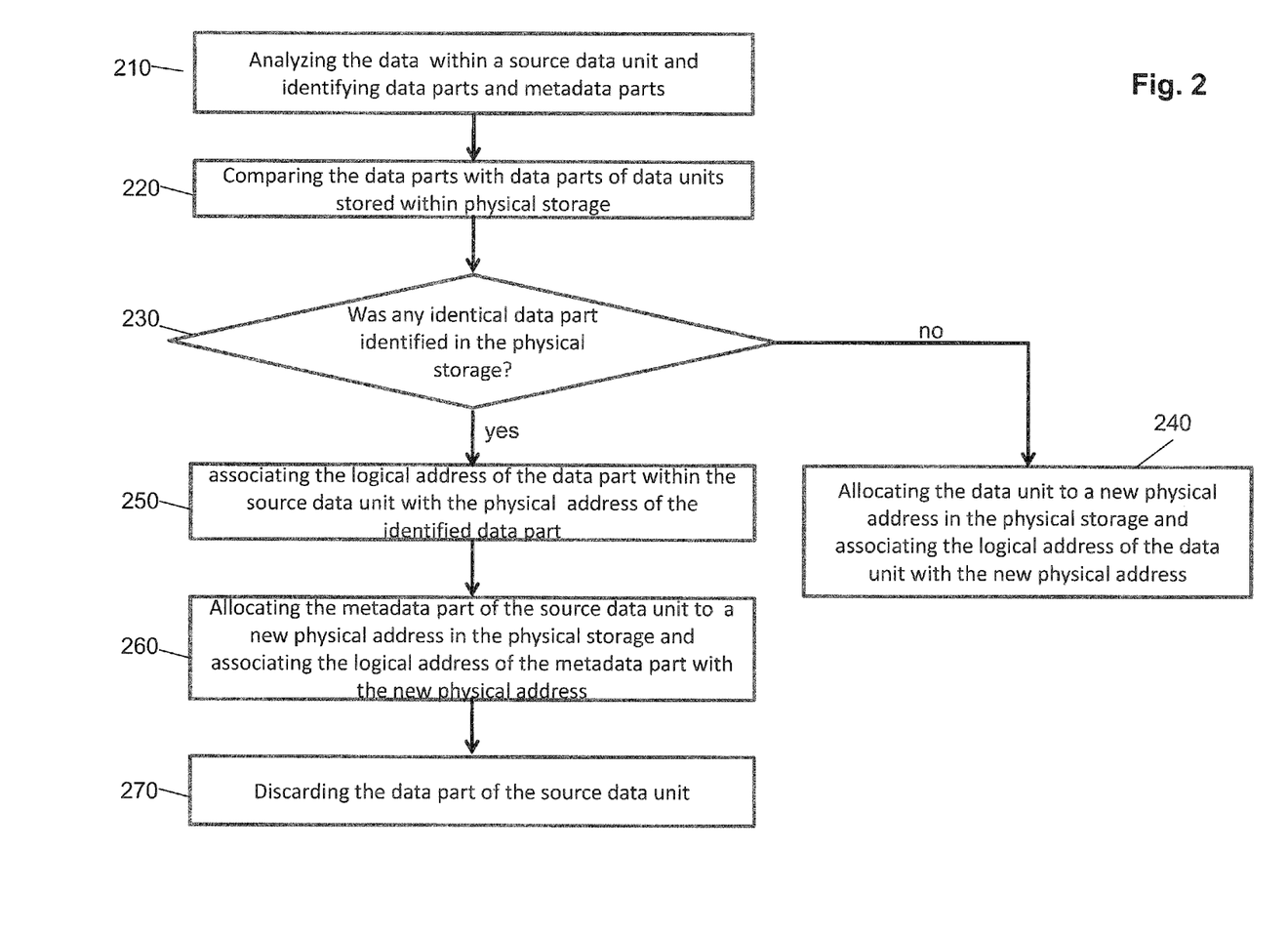
FIG. 2 is a flowchart illustrating operations which are performed in a storage optimization process, according to the disclosed subject matter.

FIG. 2 is a flowchart illustrating operations which are performed in a storage optimization process, according to the disclosed subject matter. The operation described with reference to FIG. 2 can be performed, for example, by control layer 103 and more specifically by SO module 107 associated with control layer 103.

As explained above, in some cases once a data unit is received by control layer 103, initially a decision is made as to whether, and to what extent, storage optimization should be activated. As described above with reference to FIG. 1, this decision can be made based on different factors, including: occupancy of the storage space in the physical storage, current load on the processing resources of the system, source host or part of the data portion, accessing frequency of the data portion.

In case it is determined not to proceed with storage optimization, the process can turn to the processing of a different data unit, or the process can be terminated. In case it is determined to operate storage optimization, the data unit is analyzed and data parts and metadata parts within the source data unit are identified (stage 210). SO module 107 can utilize information in respect of the format of the data unit, including for example, specific information in respect of the size and location of data parts and metadata parts within the data unit, in order to identify data and metadata.

Once the data part within the source data unit is identified and differentiated from the metadata parts in the source data unit, the data part is compared with data which is stored on the physical storage (stage 220). A hash value (e.g. CRC) can be calculated for the data part within the data unit and compared with other hash values which were calculated for data parts of other data units which are stored on the physical storage. To this end, a hash value can be calculated (e.g. by control layer 103) for data parts of each of the data unit stored in the storage system. Thus, for example, in case each data unit of 520 bytes comprises a data part of 512 bytes and a metadata part of 8 bytes a hash value can be calculated for the 512 bytes of the data part and stored in association with the corresponding data unit. Differentiating between the data part and metadata part within a data unit and comparing only the data part of a data unit with data parts of other data units stored on the storage space enables to overcome the problem which arises when attempting to execute a deduplication process on different data units which comprise identical data parts but different metadata parts. As the data parts are compared separately from the metadata parts, the identity between such data units can be identified.

In case no identity is found between the data parts of the source data unit and the data part of data units which are stored in the physical data storage, SO module 107 can be operable to allocate the data unit (including both the data part and metadata part) to a new physical address in the physical storage and associate (e.g. in the allocation table) the logical address of the data unit with the new physical address (stage 240). The hash value that was calculated for the data part of the source data unit for the purpose of comparison can be stored in association with the data unit to enable the comparison of the data part with other data parts of other data units.

In case identical data parts of a data unit which is already stored on the physical storage are identified, SO module 107 can be operable to associate the logical address of the data parts within the source data unit with the physical address of the identified data, instead of allocating a new storage space for the data part (stage 250). SO 107 can be further made operable to allocate the metadata part from the source data unit to a new physical address in the physical storage and associate the logical address of the metadata part with the new physical address (stage 260). The data part of the source data unit can then be discarded (stage 270). In case the source data unit is retrieved from data storage device $104_{1-n}$ the source data unit is already allocated to the physical storage. Thus the source data unit can be deleted from the physical storage.

Furthermore, in such a case, instead of discarding the data from the source data unit, the logical address of the data which is identical to the data from the source data unit can be associated with the physical address of the source data unit and then this data can be removed from the physical storage instead of the data from the storage data unit. This variation is also applicable in respect of to the examples illustrated with reference to FIG. 3 and FIG. 4 which are described below.

Metadata parts can be allocated to an area in the physical storage specifically designated for storing metadata parts of source data units comprising data parts with identical copies which are already stored on the storage space. In some implementations where control layer 103 is adapted to manage its storage space with data units of predefined size, the designated area is divided into data units of that size (referred to herein as a "designated data unit"). For example, as mentioned above, control layer 103 can be adapted to manage its storage space (e.g. write to the disk and read from the disk) with data portions comprising 128 blocks, each block being 520 bytes long calculating to a data unit of 66560 bytes. Such a data unit can store more than 3000, 8 bytes long metadata parts from different data units.

Accordingly, the metadata part of a source data unit can be allocated to a designated data unit (e.g. of the size of 66560 bytes) and in order to link between a given metadata part (e.g. 8 bytes long), allocated to a designated unit in the physical storage, and its corresponding source data unit, the physical address of the designated data unit and the location of the metadata part within the designated data unit (e.g. the offset of the metadata part in respect of the designated data unit) are stored in association with the logical address of the source data unit. This enables storage system 102 to utilize data units of the same predetermined size for managing the storage of the smaller metadata parts, originating from one or more source data units.

In some implementations, different metadata parts originating from different source data units are directed and stored in specific designated data units based on various characteristics of the source data unit. For example, in case data units are sorted in accordance with frequency of accessing thereof (as mentioned above with reference to U.S. provisional No. 61/391,657) data units which are accessed very often (e.g. based on a predefined threshold) can be stored in one or more specific designated data units allocated to the physical storage, while data units which are accessed less often can be stored in other designated data units.

In another example, different designated data units can be determined for each host, such that data units originating from one host are stored in a specific (one or more) designated data units allocated to the physical storage, while data units originating from another host are stored in a different (one or more) designated data units.

Figure 3:
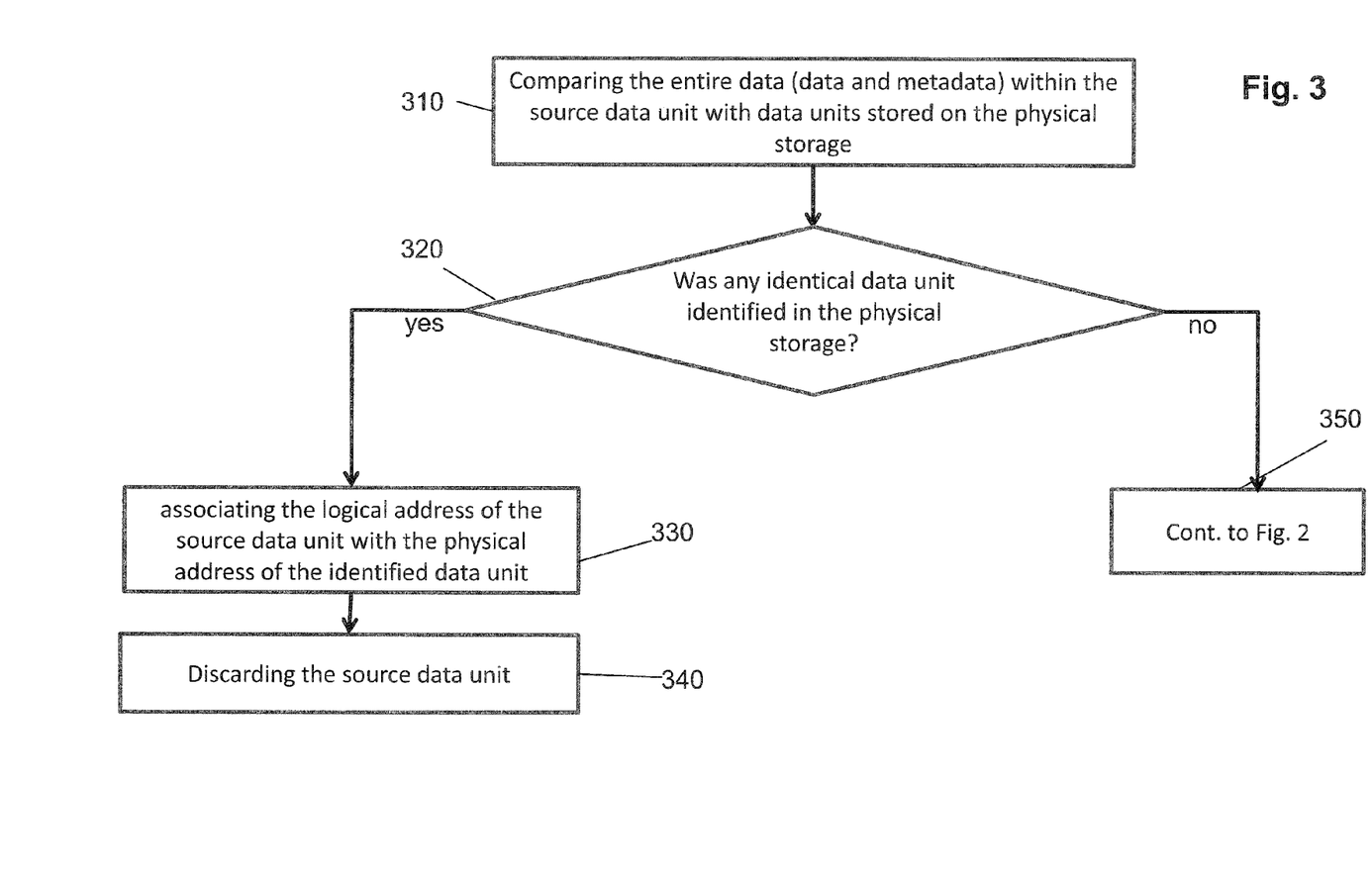
FIG. 3 is a flowchart illustrating operations which are performed in a storage optimization process, according to the disclosed subject matter.

FIG. 3 is another flowchart illustrating operations which are performed in a storage optimization process, according to the disclosed subject matter. The operations described with reference to FIG. 3 can be performed by control layer 103 or more specifically by SO module 107. According to the operations illustrated with reference to FIG. 3, before the operations described above with reference to FIG. 2 are executed, the entire data unit, including both the data parts and metadata parts, are compared with data units stored within physical storage (stage 310). To this end a hash value can be calculated for the entire data unit (including data and metadata) and compared with hash values calculated for entire data units stored in the physical storage. In a case an identical data unit is identified in the data storage, the logical address of the source data unit is associated with the physical address of the identified data unit and the source data unit is discarded (stages 330-340). In case no identical data unit is identified in the data storage the process can continue with the stages described above with reference to FIG. 2 (stage 350).

Figure 4:
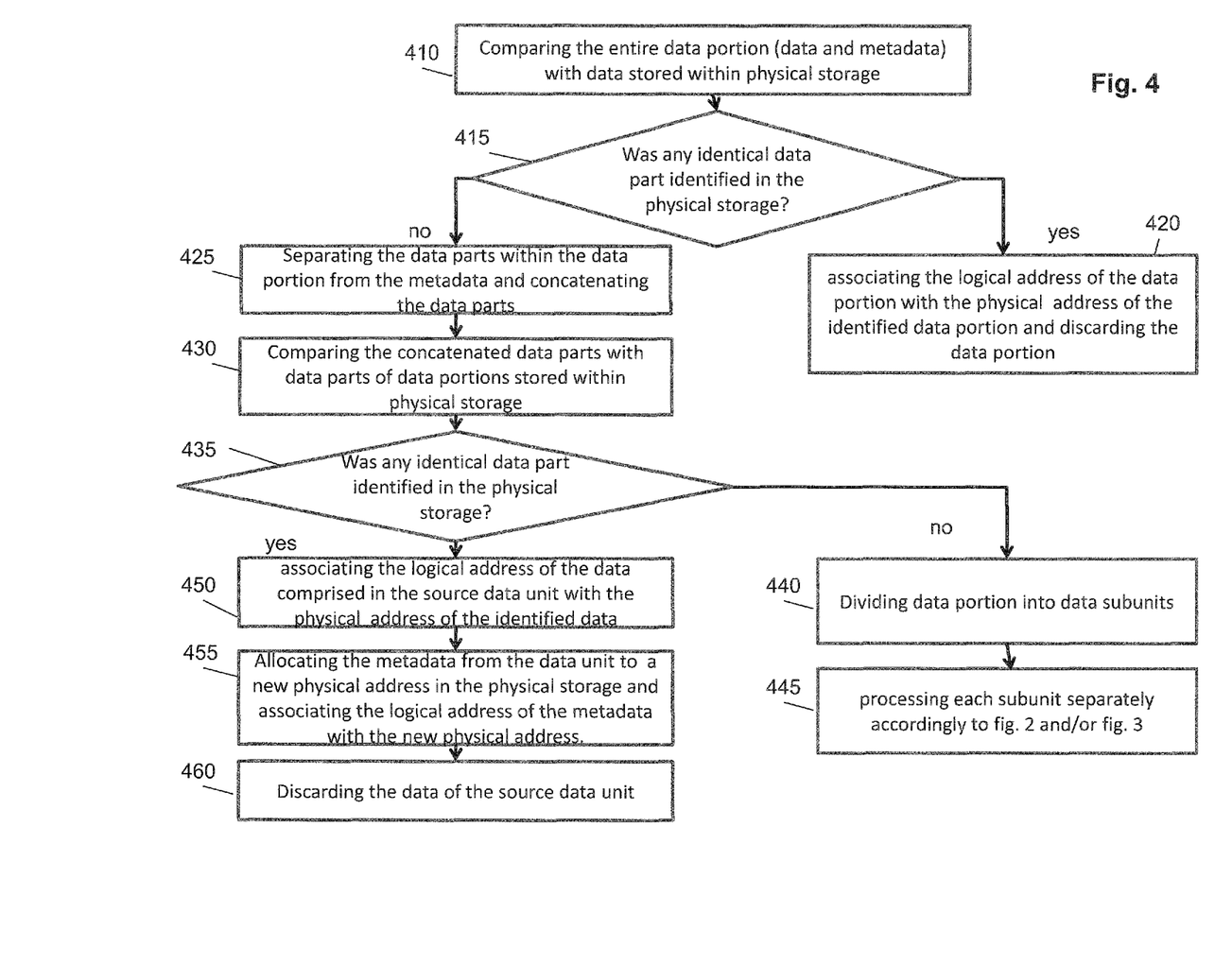
FIG. 4 is a flowchart illustrating operations which are performed in a storage optimization process, according to the disclosed subject matter.

FIG. 4 is yet another flowchart illustrating operations which are performed in a storage optimization process, according to the disclosed subject matter. The operations described with reference to FIG. 4 can be performed by control layer 103 or more specifically by SO module 107. As mentioned above with reference to FIG. 2 a decision can be made as whether to execute the operations described herein with reference to FIG. 4 based on different parameters, such as current storage space occupancy, processing load, access frequency and host.

As described above, storage system 102 can be configured to manage data units of a predefined size, such as for example a data portion 66560 bytes long. These data portions can be divided into smaller subunits, for example, 128 data blocks 8 bytes long. The information which is received by storage system 102 (e.g. from host computers $101_{1-n}$) is divided into data units of the prescribed size and these data portions are managed by the system. In some cases the subunits (e.g. blocks) within the longer data portion can comprise a data part and a metadata part, as illustrated in FIG. 7. FIG. 4 illustrates operations which can be executed when handling a data portion comprising a plurality of smaller data units characterized by data parts and metadata parts. For ease of understanding, in the following discussion the term "data portion" is used to include data units comprising subunits where the subunits comprise data parts and metadata parts as explained above.

In the first stage (stage 410), the entire data portion is compared with other data portions which are stored in the physical storage. To this end a hash value corresponding to the entire data portion (including all data and metadata of all the subunits) can be calculated and compared with hash values corresponding to other data portions stored in the physical storage. In case an identical data portion is found in the physical storage space the operation continues to stage 420 which include associating the logical address of the data portion with the physical address of the identified data portion. As previously described, the link between the logical address of the source data portion and the physical address of the identified identical data portion can be recorded in an allocation table. The source data portion can be then discarded.

In case an identical data portion is not found in the physical storage space the process proceeds to determine whether similarity exists between the data part within the data portion and the data parts of other data portions which are stored in the physical storage. To this end, the data parts within the source data portion are separated from the metadata parts within the source data portion. This can be accomplished based on information which is made available to control layer 103 specifying the layout of the data within the data portion. For example, in case a data portion comprises 128 blocks of data, each block characterized by the format depicted in FIG. 7, control layer 103 can separate data and metadata based on the location of each block within the data portion and the size and location of metadata in each block.

Once separated, the entire data parts can be concatenated into one unit of data, combining all data parts within the source data portion. A hash value corresponding to concatenated data parts can be calculated and used for comparing with other hash values corresponding to other data parts of data portions stored within the physical storage. Hash values corresponding to the data parts within data portions which are stored in the physical storage can be calculated in respect of each data portion. In some implementations such hash values can be calculated for example when a data portion is first introduced to storage system 102 and can then be stored in association with the data portion.

In case a data portion having identical data parts is found within the physical storage the process proceeds to stage 450 where the data parts within the source data portion are associated (e.g. in an allocation table) with the physical address of the corresponding identical data parts of the identified data portion. The metadata parts within the source data portion are allocated to a new physical address in the physical storage and the logical address of the metadata is associated with the new physical address (stage 455). The data parts within the source data portion can be discarded (stage 460).

As explained before, in case storage system 102 is configured to manage data of predefined size (e.g. data portion) the metadata parts from the source data portion are allocated to a designated data portion. In order to link between a given metadata part (e.g. 8 bytes long), allocated to a designated area in the physical storage, and its source data portion, the physical address of the designated data unit and the location of the metadata part within the designated data unit (e.g. the offset of the metadata part in respect of the designated data unit) are stored in association with the logical address of the source data portion.

In case no data portion with identical data parts is found within the physical storage space, the source data portion can be divided into its smaller subunits (e.g. 520 byte long blocks) and each subunit can then be processed in accordance with the operations illustrated above with reference to FIG. 2 and/or FIG. 3 (stage 445). In some cases the process can turn from stage 415 stage 440 for dividing the data portion into its subunits without performing the comparison of the concatenated data parts as described above.

Figure 5:
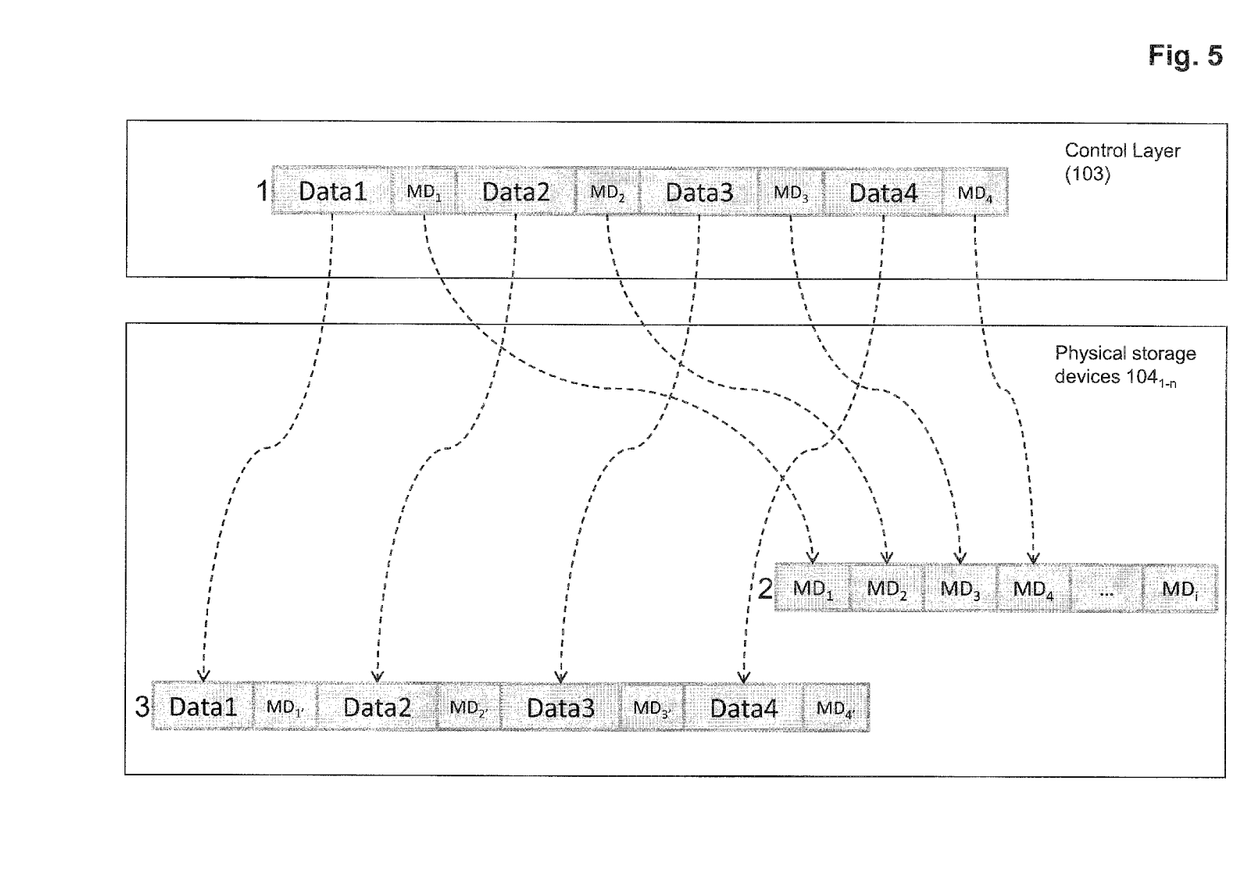
FIG. 5 is an illustrations demonstrating data allocation in a storage optimization process, according to the disclosed subject matter.

FIG. 5 is an illustration demonstrating data allocation in a storage optimization process, according to the disclosed subject matter. It should be noted that FIG. 5 is merely a schematic illustration of an example, which is used for more clearly explaining the operations disclosed herein and should not be construed as limiting in any way. FIG. 5 shows three data portions 1, 2 and 3. Data portions are schematically represented as a vector of cells wherein each cell is denoted with the word "data" to indicate data parts or with the letters "MD" to indicate metadata parts.

Data portion 1 represents a source data portion, which may have been, for example, received from a host to be written to the physical storage space in storage system 102. Data portion 1 includes data units (e.g. blocks) each including data parts and metadata parts. Data portion 3 is stored within the physical storage space of storage system 102. As explained above with reference to FIG. 4 the source data portion is compared with data portions which are stored with the physical storage of storage system 102. Assume that the data parts within data portion 1 are identical to the data parts within data portion 3 while the metadata parts in the two data portions are different. Due to these differences in the metadata parts, when these two data portions are compared in their entirety, no identity is found. However, when the metadata is separated from the data parts and only the data parts of the two data portion are compared, the identity between the data parts within the two data portions can be identified.

Once it is identified that the data parts within data portion 1 are identical to the data parts within data portion 3, the logical address of the parts within data portion 1 are associated (e.g. linked) to the physical address of the corresponding data parts within data portion 3. This is schematically illustrated in FIG. 5 by the arrows linking between data parts within the source data portion 1 and the corresponding data parts within data portion 3.

The metadata parts within data portion 1 are allocated to a designated data portion (data portion 2) and the logical address of the metadata parts are associated with the new physical address which was allocated in the designated data portion 2. This is schematically illustrated in FIG. 5 by the arrows linking between metadata parts within source data portion 1 and the corresponding metadata parts within designated data portion 2. Although FIG. 5 shows only one source data portion, designated data portion 2 can be used to store metadata parts originating from more than one source data portion. The physical address of the designated data portion and the offset of each data part within the designated data portion can be maintained in an allocation table to enable to link between the metadata parts with the corresponding source data portion.

Figure 6:
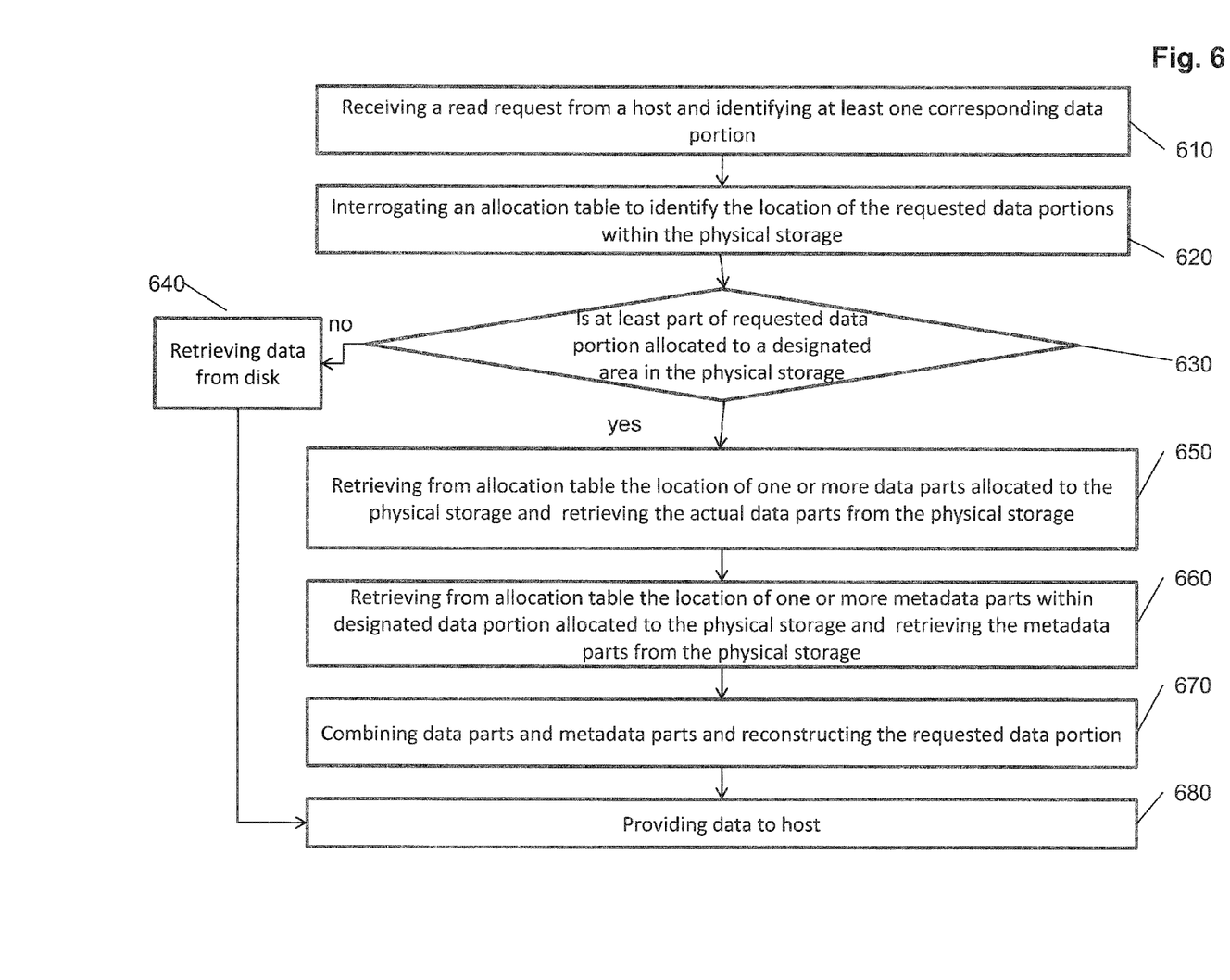
FIG. 6 is a flowchart illustrating operations which are performed in response to a read request, according the disclosed subject matter; and, FIG. 7 is a schematic illustration of a data unit comprising data parts and a metadata part (DIF tuple), according to the disclosed subject matter.

FIG. 6 is a flowchart illustrating operations which are performed in response to a read request, according the disclosed subject matter. When receiving a read request from a host, including the logical address (stage 610) of the data, storage control layer 103 is operable to identify (e.g. via allocation module 105) one or more corresponding data units and to determine the physical location(s) of the desired data units based on their logical addresses. To this end, an allocation table mapping between the logical address and physical address of the data can be interrogated and the physical address can be determined (stage 620).

In stage 630 it is determined whether at least part of the metadata of the requested data units is allocated to a designated data unit. An allocation table which is managed by allocation module 105 can include an indication that enables to associate between the logical address of a requested data unit and a corresponding designated data unit allocated to the physical storage. In some implementations, the allocation table specifies information indicating the logical address of the metadata parts (enabling to locate the metadata parts within the original source data units), the location of the corresponding designated data unit within the physical storage, and the location of the metadata parts within the designated data units. Thus, metadata parts, of a requested data portion, which are allocated to a designated data portion in the physical storage, can be located and retrieved from the physical storage based this information.

In case it is determined that no part of the requested data unit is allocated to a designated data unit in the physical storage, the requested data unit is retrieved from the physical storage (stage 640) and provided to the requesting host (stage 690). In some cases different data subunits (e.g. blocks) of a requested data unit can be linked to corresponding subunits allocated to different locations in the physical storage. In such cases control layer 103 (e.g. with the help of SO module 107) can be configured to identify the different data subunits in the different locations, retrieve the data from the different locations and combine all subunits together in order to reconstruct the requested data unit.

In case it is determined that at least part of the metadata parts of the requested data unit has been stored by a storage optimization process disclosed herein in a designated data unit allocated to the physical memory, the data parts of the requested data units are retrieved from the physical storage. To this end the allocation table is utilized for obtaining the location of the different data parts of the requested data unit and for retrieving these data parts from the physical storage based on this information (stage 650).

The location of the designated data unit containing the metadata parts of the requested data unit is also obtained from the allocation table, as well as the location of the metadata parts within the designated data unit. This information is then used for retrieving the metadata parts of the requested data unit from the corresponding (one or more) designated data units (stage 660).

The data parts and metadata parts can then be concatenated according to their logical address, which can also be retrieved from the allocation table, thereby reconstructing the requested data unit (stage 670). The reconstructed data unit can be provided to the requesting host (stage 690).

It will be understood that the system according to the disclosed subject matter may be a suitably programmed computer. Likewise, the disclosed subject matter contemplates a computer program being readable by a computer for executing the method of the invention. The disclosed subject further contemplates a machine-readable memory tangibly embodying a program of instructions executable by the machine for executing the method of the invention.

Those skilled in the art will readily appreciate that various modifications and changes can be applied to the embodiments of the invention as hereinbefore described without departing from its scope, defined in and by the claims associated with the present invention.

The invention claimed is:

1. A storage system, the system comprising:
a storage optimization (SO) module operatively coupled to a physical storage space storing a plurality of data units, each data unit of said plurality of data units comprising a data art and a metadata part, wherein said metadata part is added to the data unit by an application that is external to the SO module and wherein the SO module is configured to deduplicate data units that differ only in metadata parts comprised therein, by:
differentiate a first data part from a first metadata part, wherein said first data part and said first metadata part are sequentially comprised within a first data unit; and
identify a second data unit among said plurality of data units that is partly identical to said first data unit, said second data unit comprises a second data part, which is identical to said first data part, and a second metadata part, which is different from said first metadata part;
associate a logical address corresponding to said first data part with a physical address corresponding to said second data part;
store said first metadata part in a designated area in said physical storage space and associate a logical address corresponding to said first metadata part with a physical address corresponding to said designated area; and
discard said first data part of said first data unit, thereby reducing volume of stored data in said physical storage space.

2. The system of claim 1 wherein said designated area is a certain data unit from among said plurality of data units, designated for storing metadata parts of multiple partly identical data units.

3. The system of claim 1 wherein said SO module is further operable to utilize information in respect of a format of said first data unit including at least a size of said first metadata part and its location in respect of said first data unit and is operable to identify said first data part and said first metadata part within said data unit and to differentiate said first data part from said first metadata part, based on said information.

4. The system of claim 1 wherein said SO module is operable to identify a third data among said plurality of data units, having a third data part which is identical to said first data part, and having a third metadata part, which is identical to said first metadata part, by comparing said first data unit with data units from said plurality of data units; associate a logical address corresponding to said first data unit with a physical address corresponding to said third data unit and discard said first data unit.

5. The system of claim 1 wherein said SO module is operable to calculate a hash value for said first data part; wherein said identifying is performed by comparing said hash value with other hash values calculated for data parts of at least part of said plurality of data units.

6. The system of claim 1 wherein the SO module is further operable to divide a data unit into a plurality of subunits, and wherein said first data unit is one of subunits generated by such division.

7. The system of claim 6 wherein said SO module is further operable to concatenate data parts corresponding to said plurality of subunits within said data unit and compare said concatenated data parts with concatenated data parts corresponding to other data units stored within said physical storage space.

8. The system of claim 1 wherein said SO module is operatively connectable to one or more hosts, external to the storage system, and is operable to receive said first data unit from said one or more hosts.

9. The system of claim 1 wherein said SO module is operatively connectable to one or more hosts and, in response to a read request issued by a host requesting to read said first data unit operable to perform at least the following:
identify that said first metadata part is characterized by a logical address associated with said designated area;
retrieve said first metadata part from said designated area based on its physical address;
retrieve said first data part from the physical address corresponding to said second data unit;
combine said first data part and said first metadata part and reconstruct said first data unit.

10. The system of claim 1 wherein said SO module is further operable to determine whether to perform the deduplication based on current storage space availability within said physical storage space and/or current load on processing resources of said storage system.

11. An SO (storage optimization) module operatively connectable to a storage control layer in a storage system and coupled to a physical storage space storing a plurality of data units, each data unit of said plurality of data units comprising a data part and a metadata part, wherein said metadata part is added to the data unit by an application that is external to the SO module and wherein the SO module is configured to deduplicate data units that differ only in metadata parts comprised therein, by:
differentiate a first data part from a first metadata part, wherein said first data part and said first metadata part are sequentially comprised within a first data unit; and
identify a second data unit among said plurality of data units that is partly identical to said first data unit, said second data unit comprises a second data part, which is identical to said first data part, and a second metadata part, which is different from said first metadata part;
associate a logical address corresponding to said first data part with a physical address corresponding to said second data part;
store said first metadata part in a designated area in said physical storage space and associate a logical address corresponding to said first metadata part with a physical address corresponding to said designated area; and
discard said first data part of said first data unit, thereby reducing volume of stored data in said physical storage space.

12. A method of allocating data to a physical data storage in a storage system comprising a storage optimization (SO) module operatively coupled to a physical storage space storing a plurality of data units, each data unit of said plurality of data units comprising a data part and a metadata part, the method comprising:

differentiating, by the SO module, a first data part from a first metadata part, wherein said first data part and said first metadata part are sequentially comprised within a first data unit, and wherein said first metadata part is added to said first data unit by an application that is external to the SO module prior to the step of differentiating;

identifying, by the SO module, a second data unit among said plurality of data units that is partly identical to said first data unit, said second data unit comprises a second data part, which is identical to said first data part, and a second metadata part, which is different from said first metadata part;

associating a logical address corresponding to said first data part with a physical address corresponding to said second data part;

storing said first metadata part in a designated area in said physical storage space and associate a logical address corresponding to said first metadata part with a physical address corresponding to said designated area; and discarding said first data part of said first data unit, thereby reducing volume of stored data in said physical storage space.

13. The method of claim 12 wherein said designated area is a certain data unit from among said plurality of data units, designated for storing metadata parts of multiple partly identical data units.

14. The method of claim 12 further comprising:
utilizing information in respect of a format of said first data unit including at least a size of said first metadata part and its location in respect of said first data unit and wherein the differentiating of said first data part from said first metadata part is based on said information.

15. The method of claim 12 further comprising:
identifying a third data unit among said plurality of data units, having a third data part which is identical to said first data part, and having a third metadata part, which is identical to said first metadata part, by comparing said first data unit with data units from said plurality of data units, thereby giving rise to identical data units;
associating a logical address corresponding to one of said identical data units with a physical address of another identical data unit of said identical data units and discard said one of said identical data units.

16. The method of claim 12 further comprising:
calculating a hash value for at least said first data part; wherein said identifying is performed by comparing said hash value with other hash values calculated for data parts of at least part of said plurality of data units.

17. The method of claim 16 further comprising dividing a data unit into a plurality of subunits, and wherein said first data unit is one of the subunits generated by such division.

18. The method of claim 17 further comprising concatenating data parts corresponding to said plurality of subunits within said data unit and comparing said concatenated data parts with concatenated data parts corresponding to other data units stored within said physical storage space.

19. The method of claim 12 wherein said storage system is operatively connectable to one or more hosts, external to the storage system, and wherein the method comprising receiving said first data unit from said one or more hosts.

20. The method of claim 12 further comprising:
receiving a read request issued by a host requesting for a data unit comprising said first data part and said first metadata part and in response: identifying that said first metadata part is characterized by a logical address associated with said designated area;
retrieving said first metadata part from said designated area based on its physical address;
retrieving said first data part from the physical address corresponding to said second data unit;
combining said first data part and said first metadata part and reconstructing said first data unit.

21. A program storage device readable by machine, tangibly embodying a program of instructions executable by the machine to perform method steps of allocating data to a physical data storage associated with a storage system comprising a storage optimization (SO) module operatively coupled to a plurality of physical storage devices storing a plurality of data units, each data unit of said plurality of data units comprising a data part and a metadata part, the method comprising:
differentiating, by the SO module, a first data part from a first metadata part, wherein said first data part and said first metadata part are sequentially comprised within a first data unit, and wherein said first metadata part is added to said first data unit by an application that is external to the SO module prior to the step of differentiating;
identifying, by the SO module, a second data unit among said plurality of data units that is partly identical to said first data unit, said second data unit comprises a second data part, which is identical to said first data part, and a second metadata part, which is different from said first metadata part;
associating a logical address corresponding to said first data part with a physical address corresponding to said second data part;
storing said first metadata part in a designated area in said physical storage space and associate a logical address corresponding to said first metadata part with a physical address corresponding to said designated area; and
discarding said first data part of said first data unit, thereby reducing volume of stored data in said physical storage space.

* * * * *